United States Patent [19]

Lee, Jr.

[11] Patent Number: 5,459,459
[45] Date of Patent: Oct. 17, 1995

[54] METHOD AND APPARATUS FOR TRANSMITTING DATA FROM AN ENERGY METER

[75] Inventor: Robert E. Lee, Jr., Dover, N.H.

[73] Assignee: General Electric Company, Schenectady, N.Y.

[21] Appl. No.: 345,204

[22] Filed: Nov. 25, 1994

Related U.S. Application Data

[63] Continuation of Ser. No. 998,061, Dec. 28, 1992, abandoned.

[51] Int. Cl.$^6$ ................................................. G08C 19/00
[52] U.S. Cl. .............................. 340/870.02; 340/825.54; 340/870.01; 340/870.28; 324/142; 364/483
[58] Field of Search ............... 340/870.02, 870.40, 340/505, 870.01, 870.29, 825.54, 870.28; 364/483, 464; 324/142

[56] References Cited

U.S. PATENT DOCUMENTS

| | | | |
|---|---|---|---|
| 3,702,460 | 11/1972 | Blose | 340/825.15 |
| 4,190,800 | 2/1980 | Kelly, Jr. et al. | 340/310 A |
| 4,393,501 | 7/1983 | Kellog et al. | 371/33 |
| 4,439,764 | 3/1984 | York et al. | 340/870.02 |
| 4,442,492 | 4/1984 | Karlsson et al. | 340/870.05 |
| 4,465,970 | 8/1984 | DiMassimo et al. | 324/116 |
| 4,467,434 | 8/1984 | Hurley et al. | 340/870.02 |
| 4,491,791 | 1/1985 | Balch et al. | 340/870.02 |
| 4,491,792 | 1/1985 | Bullock et al. | 340/870.02 |
| 4,491,793 | 1/1985 | Germer et al. | 324/157 |
| 4,571,692 | 2/1986 | Germer | 364/483 |
| 4,697,182 | 9/1987 | Swanson | 340/870.02 |
| 4,720,851 | 1/1988 | Smith | 340/870.02 |
| 4,749,992 | 6/1988 | Fitzemeyer et al. | 340/870.02 |
| 4,803,632 | 2/1989 | Frew et al. | 340/870.02 |
| 4,811,011 | 3/1989 | Sollinger | 340/870.02 |
| 4,902,962 | 2/1990 | Bodrug et al. | 340/870.02 |
| 5,059,896 | 10/1991 | Germer et al. | 324/142 |
| 5,155,481 | 10/1992 | Brennan, Jr. et al. | 340/870.02 |
| 5,229,713 | 7/1993 | Bullock et al. | 324/142 |

OTHER PUBLICATIONS

Engineering Presentation to AEIC/EEI Meter and Service Committees, Apr. 8, 1991 (pp. 1–14).
Engineering Presentation to AEIC/EEI Meter and Service Committees, Sep. 9, 1991 (pp. 1–5).
UCNet System Brochure Sep. 9, 1991 E.
Utility Context Part B Standard Protocol Tables May 12, 1992 (p. 69, Table 40, 94–97).
Standard Meter Reading Protocol, GEI-52556 Nov. 1991.
Extended Meter Reading Protocol, Dec. 4, 1992.
Optocom—2 Protocol, GEI-52558, Dec. 27, 1991.
Optocom—2 Protocol, Appendix A: UCNet Phase 3, Dec. 9, 1992.
U.S. Patent Application Serial No. 07/968,959, filed Oct. 30, 1992, Apparatus for retaining data in a system for remotely reading meters.
U.S. Patent Application Serial No. 07/968,958, filed Oct. 30, 1992, Apparatus for Temporarily Interrupting Tou and Load Control Schedules.

*Primary Examiner*—John K. Peng
*Assistant Examiner*—Daniel J. Wu
*Attorney, Agent, or Firm*—Bell, Seltzer, Park & Gibson

[57] ABSTRACT

The present invention, in one embodiment, is an algorithm for implementation in a meter register and an reading device. In the one embodiment, the present invention enables selecting a display table to be read from the register, updating the billing read date and time in the register, reversing the order in which load profile (LP) data is transmitted from the register to the reader, specifying the number of LP intervals to be read from the register, and specifying the number of intervals to skip when reading from the register.

18 Claims, 8 Drawing Sheets

METHOD AND APPARATUS FOR TRANSMITTING DATA FROM AN ENERGY METER

This application is a continuation of application Ser. No. 07/998,061, filed Dec. 28, 1992, now abandoned.

BACKGROUND OF THE INVENTION

A. Field of the Invention

The present invention is generally related to meters, and more specifically, relates to reading and programming an electronic meter.

B. Related Art

Electronic meters comprising energy registers and optical communications ports are well known in the art. Examples of reading/programming apparatus for reading information from and programming operation of electronic meter registers are set forth in U.S. Pat. Nos. 4,393,501, 4,491,791, 4,491,792 and 4,491,793. Examples of electronic registers are set forth in U.S. Pat. Nos. 4,571,692 and 4,465,970. Examples of electronic meters are set forth in U.S. Pat. No. 5,059,896.

With an electronic register, such register often is initially programmed (e.g., at the factory or at a utility meter shop) to transmit data in a pre-determined format. Particularly, a meter register comprises a microcontroller, a display, and memory elements. The register receives metering pulses from the meter unit. Each pulse represents a pre-determined quantum of energy consumed by a load. The register processes the input pulses in accordance with a pre-defined function, e.g., demand, time-of-use, etc. The data is then stored in the register memory for display and/or transmission.

Flexibility in the transmission of the data between the meter register and reader often is desired. For example, when reading revenue and load profile data from an electronic meter register, it is desirable to transmit, from the register, the most current load profile data in the selected format. Such option preferably is provided regardless of the display format selected for the transmission when the register was initially programmed.

SUMMARY OF THE INVENTION

The present invention, in one embodiment, is an algorithm for reading revenue, e.g., time-of-use information, data and load profile (LP) data from an electronic register. More particularly, in one embodiment, the present algorithm enables a user to select a display table to be read from the register, to update the billing read date and time in the register, to reverse the order in which load profile (LP) data is transmitted from the register, to specify the number of LP intervals to be read from the register, and to specify the number of intervals to skip when reading from the register.

BRIEF DESCRIPTION OF THE DRAWINGS

These and other objects of the present invention, together with further features and advantages thereof, will become apparent from the following detailed specification when read together with the accompanying drawings, in which.

DETAILED DESCRIPTION OF THE DRAWINGS

The present invention is directed specifically to an algorithm, partially implemented in a meter register forming part of an energy meter and partially implemented in a device (e.g., a handheld computer, a personal computer) configured for reading data from the register. The coupling between the meter register and the reading device, sometimes referred to herein as a reader, may be a well known coupling such as optical, RS-232 or some other media.

The present invention, for example, may be practiced in combination with a meter such as the meter described in U.S. Pat. No. 5,059,896 coupled to an electronic register such as the register described in co-pending U.S. Pat. application Ser. No. 07/691,252, filed Apr. 25, 1992 or in U.S. Pat. No. 4,465,970, all of which are hereby incorporated, in their entirety, herein by reference.

In addition, the present invention can be utilized in connection with protocols such as the protocols described in the following documents, all of which are available from General Electric Company, 130 Main Street, Somersworth, N.H. 03878: Extended Meter Reading Protocol, 12/4/92; and Standard Meter Reading Protocol, GEI-52556, 11/91, all of which are incorporated herein, in their entirety, by reference.

Figure 1:
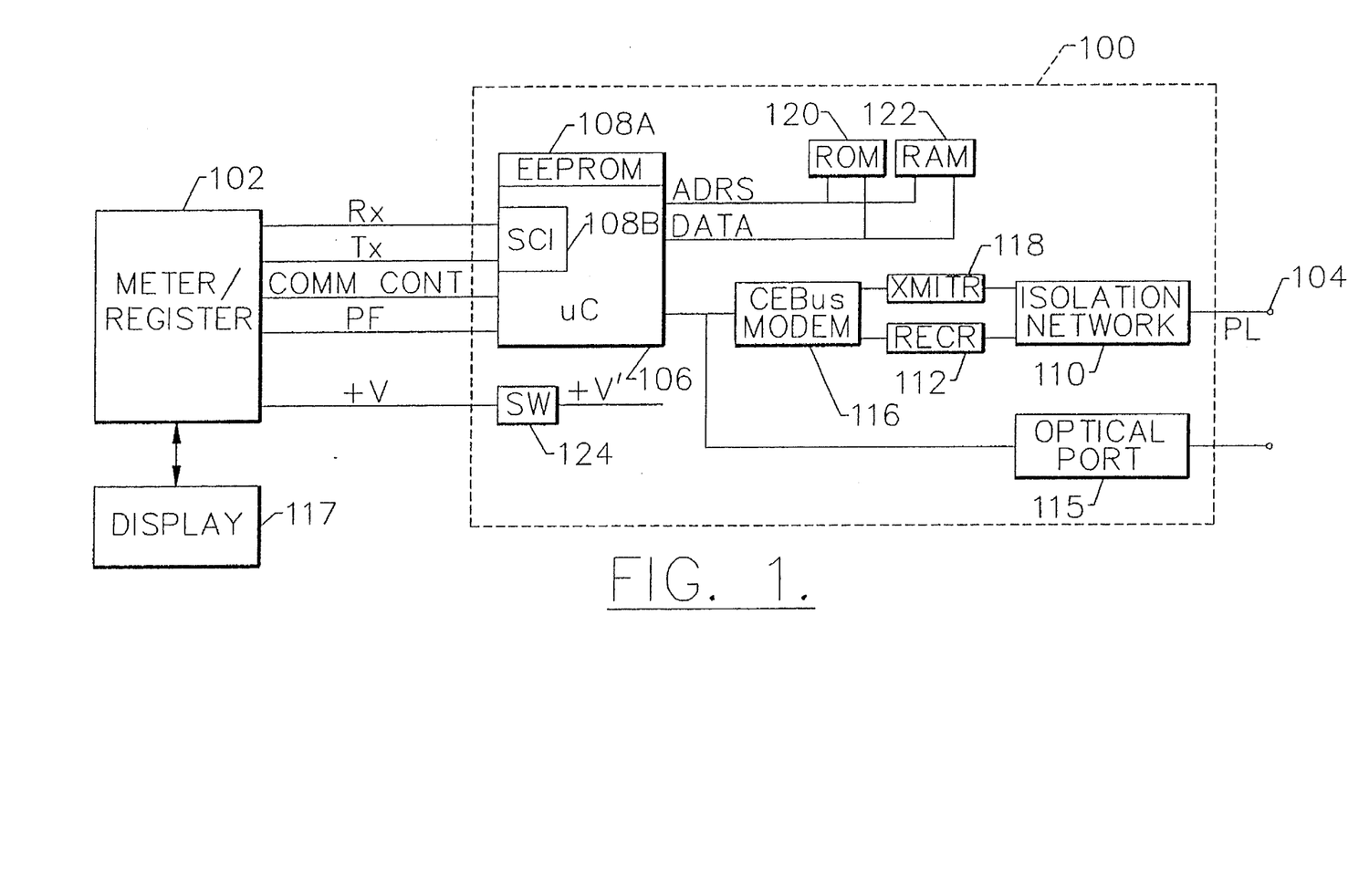
FIG. 1 is a block diagram description of one embodiment of a power line communication circuit.

Referring now to FIG. 1, a block diagram description of one embodiment of a power line communication circuit 100, sometimes referred to herein as a communications unit, coupled between a meter/register 102 and a power line 104. The communication circuit 100, for example, would be physically disposed within the meter enclosure. More particularly, the circuit 100 may be embodied in a printed circuit board disposed within the enclosure of the energy meter. The circuit 100 is shown separate from the meter/register 102 for illustration purposes only. An example of an electronic energy meter in which the circuit 100 may be disposed and coupled to is the meter commonly known as the Phase3 meter which is commercially available from General Electric Company, 130 Main Street, Somersworth, N.H. 03878.

In a first communication mode, the circuit 100 receives information transmitted over the power line 104. The information present on the power line 104 may, for example, be information sent from a communicating device disposed on a utility pole. Such communication device is coupled to the power lines disposed between the secondary side of a distribution transformer and a meter as described in U.S. Pat. Nos. 3,702,460 and 4,749,992 (relay module). The power line 104 may be one of such secondary distribution power lines.

The circuit 100 includes a micro-controller 106 which may be a Motorola 68HC11A1 Micro-controller. The micro-controller 106 includes a EEPROM 108A and a serial communications interface (SCI) 108B. The SCI 108B is utilized for communicating with the meter/register 102 via receive (Rx), transmit (Tx) and communication control (COMM CONT) lines. The circuit 100 also includes an isolation network 110 which couples to the power line 104 and blocks the 50/60 Hz line voltage present on the line 104. A receiver filter 112 serves as a filter/amplifier and removes any undesired signals from the signal output from the isolation network 110. The receiver filter 112 limits the received signal to the 100–400 kHz band and biases the signal for the CEBus modem 116. The modem 116 may be the Intellon SSM10CE spread spectrum power line communication microchip. A transmitter filter 118 operates in the same manner as the receiver filter 112 except that the transmitter filter 118 is for signals to be placed on the power line 104.

The circuit 100 also includes a ROM 120 and a RAM 122 coupled to the micro-controller 106 via address (ADRS) and data (DATA) lines, and a power switch 124. Power for the circuit 100 is provided from a voltage +V' coupled through the switch 124 from a voltage +V provided by the meter/register 102.

Briefly, in operation, data is transmitted and received over the power line 104 in CEBus defined "packets" which may consist of a preamble, a packet body, and a CRC code. When an in-band signal is received, the CEBus modem 116 demodulates the signal and after recognizing the preamble, alerts the micro-controller 106 of an incoming message. When the packet body is received and demodulated, the modem 116 transfers the body as serial data to the micro-controller 106 in 8-bit bytes.

The micro-controller 106, through its programmed operational code stored in the ROM 120, accepts the input request from the modem 116 and performs the requested task. The task could involve assembling data from the RAM 122 or from the meter/register 102. The micro-controller 106 communicates with the meter/register 102 via the SCI 108B which permits asynchronous data interchange. The data is then fed to the modem 116 for transmission through the transmitter filter 118 and isolation network 110 to the power line 104.

The micro-controller 106, alternatively, through its programmed operational code stored in the ROM 120, accepts the input request from the reader device via the SCI 108B and performs the requested task. The task could involve assembling data from the RAM 122. The response is transmitted back to the reader through the SCI.

A power fail line (PF) output from the meter/register 102 also is provided to the micro-controller 106. If the meter/register 102 indicates an impending power outage, the micro-controller 116 stops any data transfer on the power line 104, stores all necessary parameters in the internal EEPROM 108A, and then opens the power switch 124. In this manner, data can be saved.

Further details regarding the Motorola 68HC11A1 microcontroller are set forth in the M68HC11 Reference Manual, Revision 3, 1991, available from the Motorola Literature Distribution Center, P.O. Box 20912, Phoenix, Ariz., 20912. Further details regarding the Intellon SSM10CE spread spectrum power line communication microchip are set forth in the Intellon Advance Information: SSC PLCE CEBus Spread Spectrum Power Line Modem available form Intellon Corporation, 5150 West Highway 40, Ocala, Fla., 34482.

Figure 2:
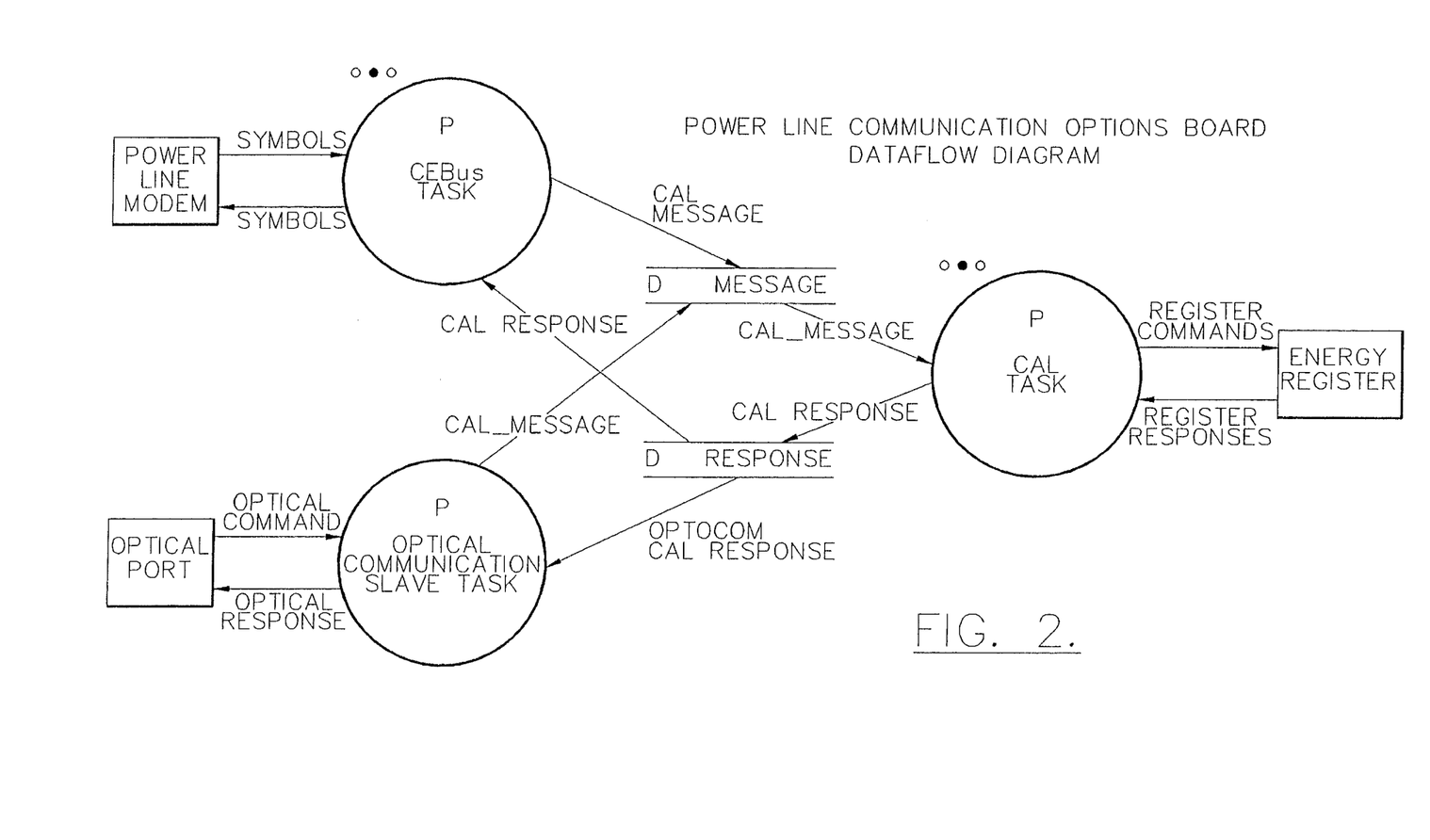
FIG. 2 is a data flow diagram for the power line communication circuit shown in FIG. 1.

Referring now to FIG. 2, a CEBus Task, CAL Task and Optical Communication Slave Task corresponding to processes performed by the processor 106 under the control of task programs stored in the ROM 120 are illustrated. The CEBus Task is associated with the Power Line Modem, the Optical Communication Slave Task is associated with the optical port of the meter, and the CAL Task is associated with the energy register of the meter. The data message/response inputs/outputs for each process are stored in the RAM 122.

In operation, and by way of example, encoded symbols from the power line modem 116 serve as input for the CEBus Task. The CAL Message output by the CEBus Task process is provided as input for the CAL Task process. As illustrated in FIG. 2, Register Commands and Register Responses may be provided from/to the CAL Task process.

In operation, and by way of another example, asynchronous ASCII characters from the SCI 108B serve as input for the optical communication slave task. The CAL message output by the optical communication slave task is provided as input for the CAL task process.

The CAL Response is output to the RAM 122 and may be communicated externally via an optical communications port through the Optical Communications Slave Task or via the power line modem 116 through the CEBus Task. Further details with respect to the contents of each layer and the purpose for the CAL and CEBus architectures are available from the CEBus Committee of the Electronics Industries Association (EIA), 2001 Pennsylvania Avenue, N.W., Washington, D.C., 20006.

The foregoing data flow diagrams are provided herein primarily for background purposes to facilitate an understanding of one context in which the present invention may be utilized. It is contemplated, of course, that the present invention can be utilized in many other contexts.

Figure 3A:
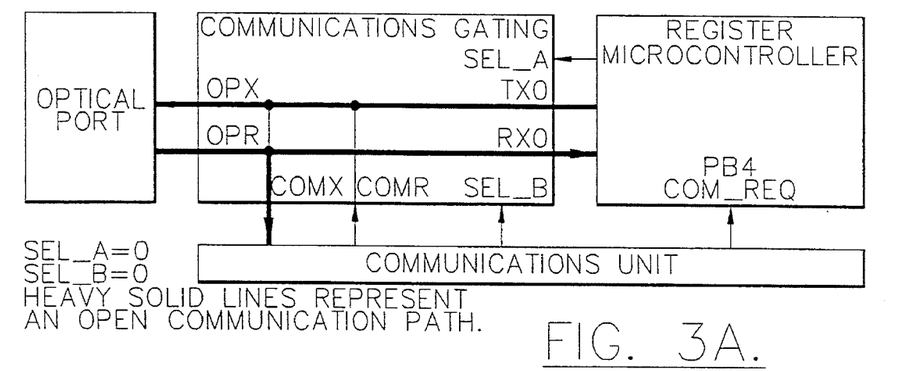
FIGS. 3A–3C are block diagrams illustrating gating logic between a meter register, the communications circuit shown in FIG. 1, and an optical port.
Figure 3B:
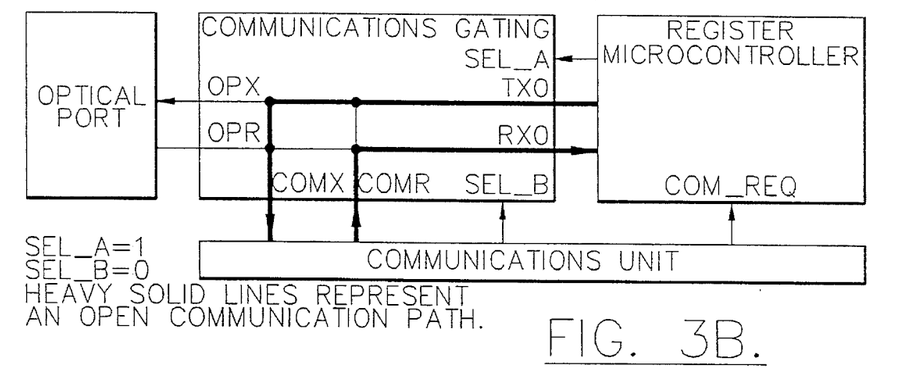
Figure 3C:
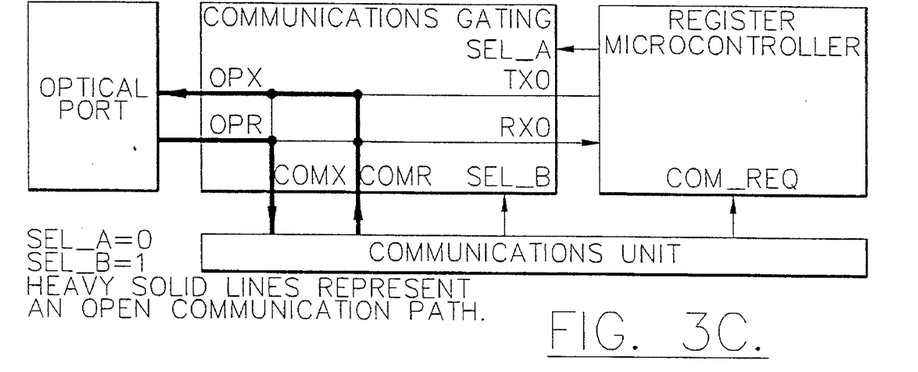

Referring now to FIGS. 3A–3C, the communication path between an optical port, a register microcontroller, an alternate communication port such as the communications unit illustrated in FIGS. 2 and 3, and a communications gating unit are illustrated. More particularly, FIG. 3A illustrates the communication path when the alternate communication port is in the standby mode. More particularly, the alternate port receives signals transmitted through the optical port to the register microcontroller but the alternate port does not detect communication from the register microcontroller to the optical port.

FIG. 3B illustrates the configuration when the alternate communications port is communicating with the register microcontroller. Particularly, no signals are passed to the optical port. FIG. 3C illustrates the configuration when the optical port and the alternate communications port are communicating. In this mode, no communications are passed to the register microcontroller.

FIGS. 4A–4D and 5A–5F illustrate operation of a reader device and a meter register in the context of the Extended Meter Reading Protocol. The present invention, however, has utility in contexts other than the Extended Meter Reading Protocol and the specific description with respect to the Extended Meter Reading Protocol should not be construed as a limitation of the present invention. The algorithms illustrated in FIGS. 4A–4D and 5A–5F are interactive and depend on inputs/outputs being transmitted from one to the other. Referring now in detail to FIGS. 4A–4G, an algorithm to be executed by a reader device, sometimes referred to herein as a reader, such as the reader device available from MicroPalm Computers, Inc., 13773-500 ICOT Boulevard, Clearwater, Fla. 34620 is illustrated. The reader device, for example, would be coupled to an optical coupler, such as the SmartCoupler - 2 device, which includes an optical probe. In addition to providing optical coupling, the SmartCoupler - 2 device may perform protocol conversion so that commands and data transmitted between the reader and the meter register are properly formatted. The SmartCoupler - 2 device is commercially available from General Electric Company, 130 Main Street, Somersworth, N.H. 03878.

More particularly, the meter optical port (115) is configured to mate with the SmartCoupler device. Both the meter port and the SmartCoupler device have optical transmitting and receiving elements disposed therein. The register receives signals transmitted to the optical port (115) by the reader device via the SmartCoupler device. The register also transmits information to the reader device through the optical port (115) and to the reader device via the SmartCoupler device. In this context, the reader device is the master and the register is considered the slave. The register only responds to commands from the reader device.

Figures 4A, 4B:
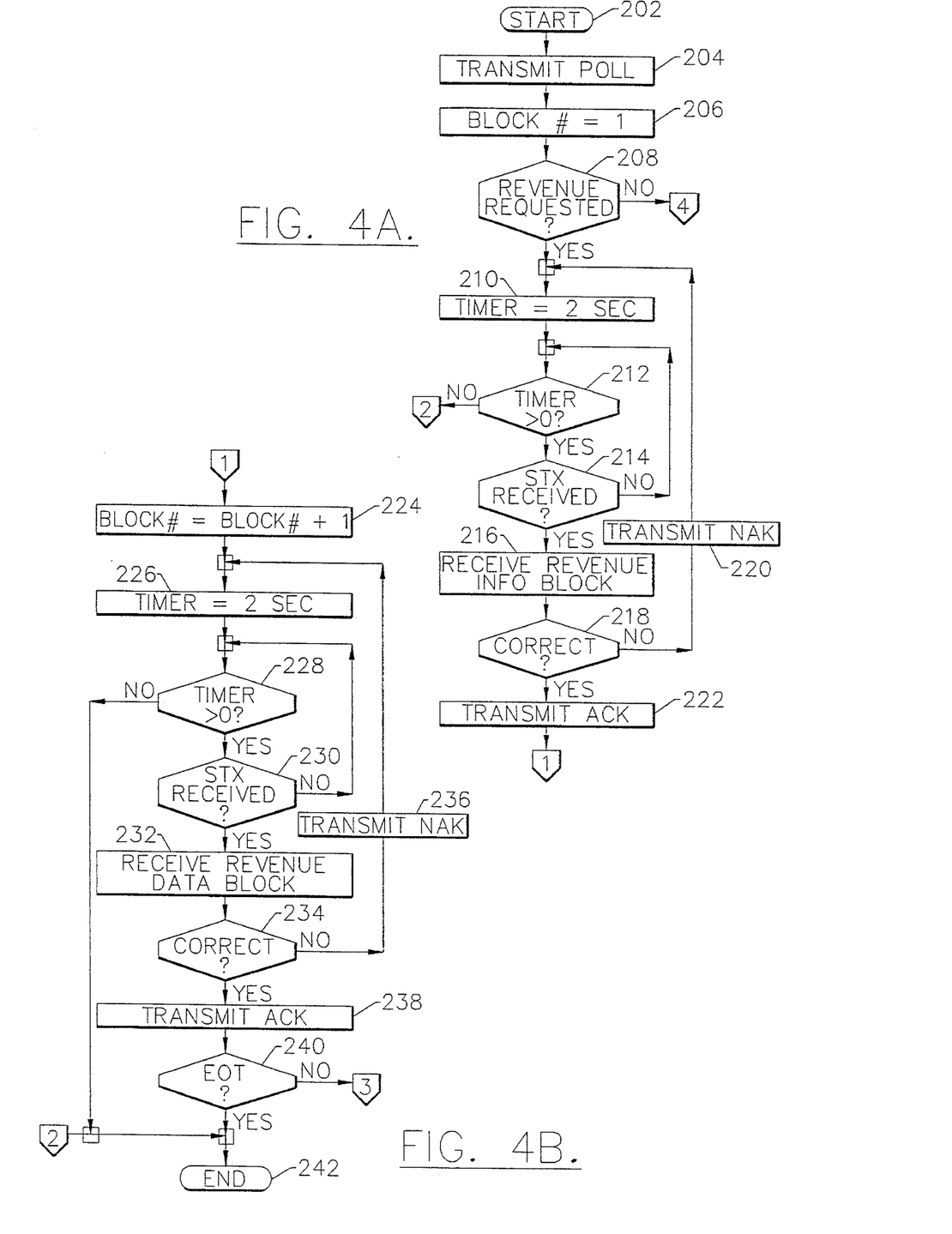
FIGS. 4A–4D are flow charts illustrating one embodiment of a sequence of process steps to be executed, in accordance with the present invention, by a reading device.

As set forth in FIG. 4A, the algorithm to be executed by the reader device begins at start legend (202), and a poll is formulated (204). In the present context, the poll should be formatted in accordance with the poll format as defined in the Extended Meter Reading Protocol (EMRP). The poll includes configuration definition information that identifies operations to be performed by the meter register. More particularly, the poll identifies which information is to be read from the register and the operations to be performed. The poll may be driven by manually keyed in requests on the reader or the poll may be driven by a pre-programmed routine stored in the reader.

Once the poll has been transmitted to the meter register, the reader device then prepares to receive data from the register. Particularly, a local variable which is used to keep track of the block number to receive is initialized to 1 (206). A determination as to whether revenue data is expected is then made (208). In the EMRP context, revenue data is expected if bit B0 of the first poll byte is set to 1. If revenue data is expected, then a timer is set for 2 seconds to wait for a response from the register (210), and the reader enters a loop in which it waits for either the timer to expire (211) or a response to arrive. If the timer has not expired (212), the reader looks for the arrival of an ASCII STX (02h) (214), which is a start of text character. A timer is considered to expire if its value reaches zero. If the timer expires, the process continues with the steps set forth in FIG. 4B. If an STX character is received before the timer expires, the reader begins to receive the register information block (216). A format for the register information block is described in detail in the EMRP.

A determination then is made as to whether information was received correctly (218). Particularly, a checksum operation is performed. Possible errors include an invalid block number (should always be '001'), an invalid checksum, the inter-character time-out is exceeded, or the block of data does not end with an ASCII ETB (17h) character, i.e., an end of text character.

If the data is not received correctly, the reader transmits an ASCII NAK (15h) (220) to indicate that the data was not received correctly, i.e., negative acknowledgment, and should be retransmitted. The reader then executes steps 210–218 again. If the register information block was received correctly, the reader transmits an ASCII ACK (06h) (222). The process then continues with the steps illustrated in FIG. 4B. Referring to FIG. 4B, the reader now prepares to receive the display data block. The block # is incremented by 1 (224) and a timer is set for 2 seconds to begin receiving the display data (226). The reader then enters a loop (227, 228, 230) to wait for the display data block to arrive. If the timer expires (228), the process is done (242). If the STX character is received before the timer expires (230), the reader receives the display data block (232). The format of the display data block is described in the Extended Meter Reading Protocol document.

A determination is then made whether the data was received correctly (234). Possible errors include an invalid block number (should always be '002'), incorrect checksum, no ASCII EOT (04h) or ETX (03b), or an inter-character time-out. If the data was received correctly, the reader transmits, to the register, an ACK (238). If the data was not received correctly, the reader transmits, to the register, a NAK (236) and performs steps 226–234 again to receive the data again. If the data was received correctly, a determination is made whether the display data block ended in an EOT (240). If the display data block ended in an EOT, this indicates that it is the end of the transmission and the process is complete (242). If the display data block ended in an ETX, load profile (LP) data should follow and the process continues with the steps illustrated in FIG. 4C.

Figures 4C, 4D:
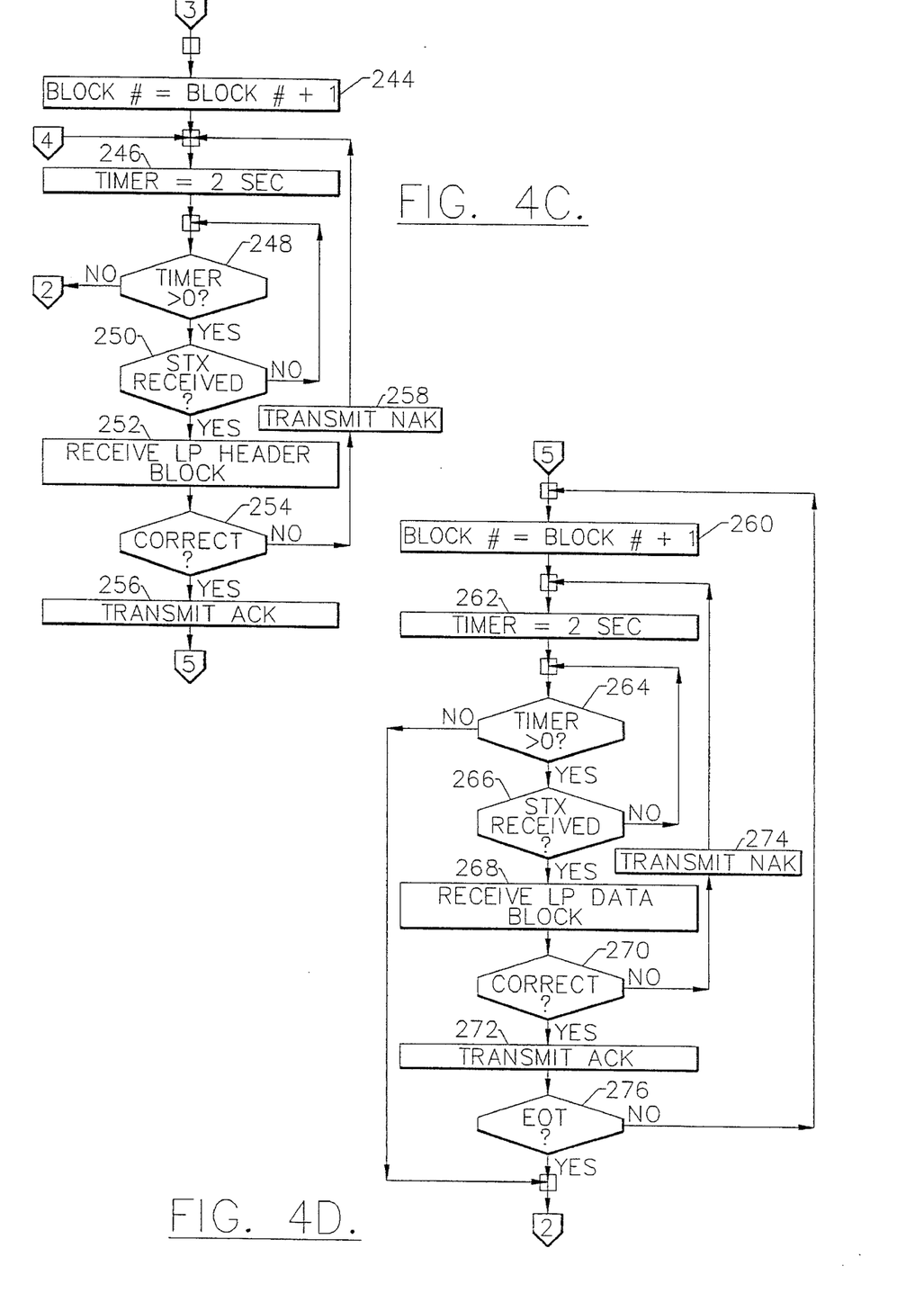

Referring now to FIG. 4C, the process continues as the reader prepares to receive load profile data. The block # is incremented by 1 (244) and the response timer is set to 2 seconds (246). The reader then enters a loop (247, 248, 250) to wait for the arrival of the LP header block. If the timer expires (248), the process is done. If the STX is received (250) before the timer expires, the reader receives the 256 byte LP header block (252). A format for the LP header block is described in the Extended Meter Reading Protocol document.

A determination is then made whether the data received was correct (254). Possible errors include an incorrect block number (should always be '003' with revenue data, '001' without), an incorrect checksum, fewer than 256 bytes, not ending with an ETB character, or an inter-character time-out. If the data was received correctly, the reader transmits an ACK (256). If an error is found in the data, the reader transmits a NAK (258) and goes through steps 246–254 to receive the LP header block again. Based on the number of bytes of LP data to be transmitted contained in the LP header block, the reader can determine the number of LP data blocks to expect. The number of LP data blocks is one more than the integer result of dividing the number of LP data bytes by 256. The process continues with the steps illustrated in FIG. 4D.

Referring to FIG. 4D, the reader prepares to receive from the register the LP data blocks. A format of the LP data blocks is described in the Extended Meter Reading Protocol document. The block # is incremented by 1 (260) and the response timer is set to 2 seconds (262). The reader then enters a loop (263, 264, 266) to receive the next LP data block. If the timer expires (264), the process is done. If an STX character is received (266), the reader receives the next LP data block (268). A determination is made whether the LP data block was received correctly (270). Possible errors include an invalid block number, an incorrect checksum, fewer than 256 bytes, an inter-character time-out, or not ending with an ETB or an EOT. If the LP data block was received correctly, the reader transmits an ACK (272). If an error was detected, the reader transmits a NAK (274) and performs steps 262–270 to receive the same LP data block again. Once the current LP data block has been received correctly, a determination is made whether the reader has received the last LP data block (276). The last LP data block ends with an EOT character instead of an ETB. If the LP data block ended with an ETB, the reader performs steps 260–272 to receive the next LP data block. When the last LP data block is received correctly, the process is complete. Referring now to FIGS. 5A–5F, a sequence of process steps to be performed by a meter register in accordance with the present invention is illustrated. As set forth above, the algorithm illustrated in FIG. 5A–5F are interactive with the algorithm illustrated in FIGS. 4A–4D.

Figures 5A, 5B, 5C:
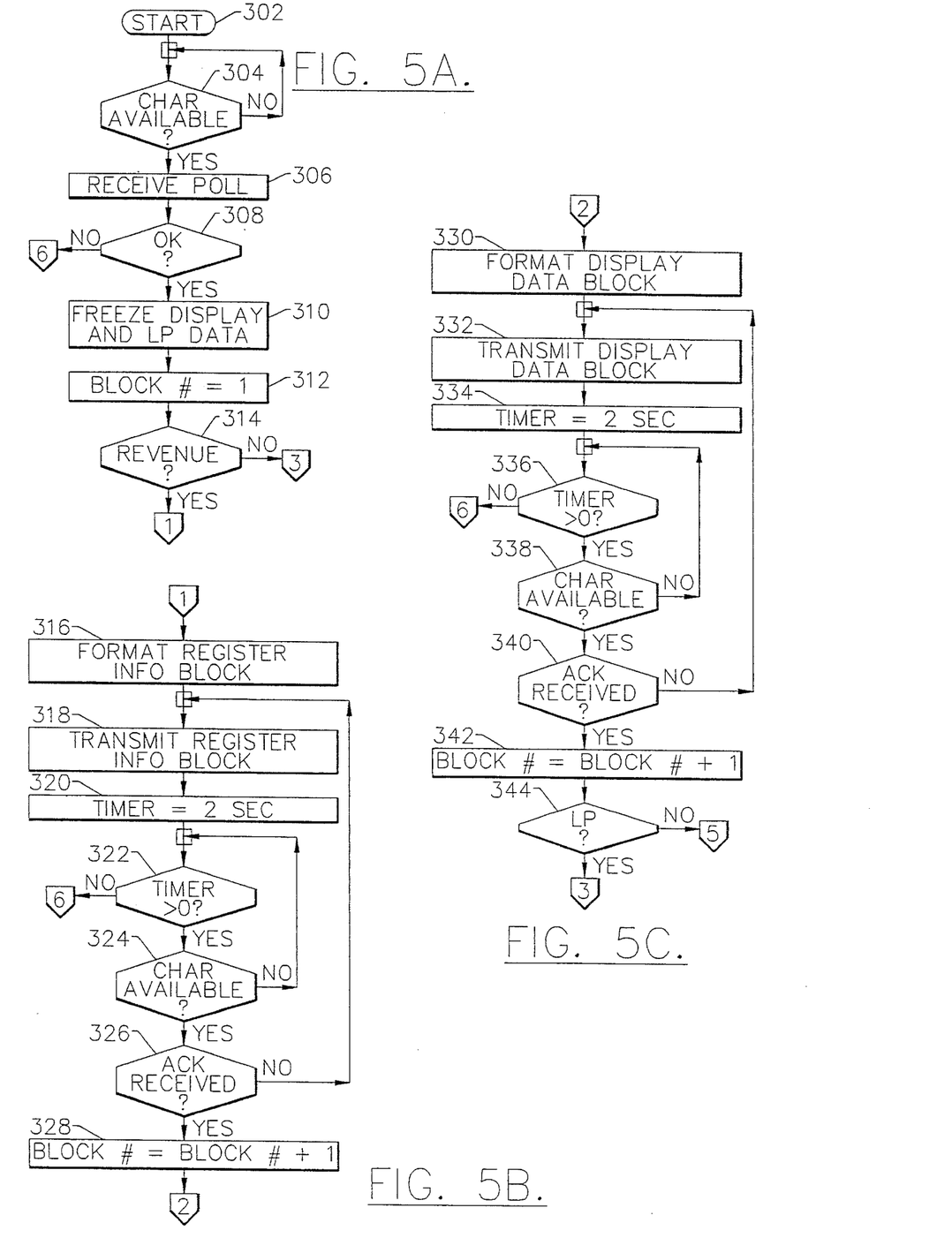
FIGS. 5A–5F are flow charts illustrating one embodiment of a sequence of process steps to be executed, in accordance with the present invention, by a register device.

As set forth in FIG. 5A, the process begins as indicated by start legend (302). The register then waits for a character to be received from the reader (304). When a character is available, the register receives the poll bytes from the reader (306). A determination is made whether the poll is properly formatted (308). A format of the poll bytes is described in the Extended Meter Reading Protocol document. Possible errors include the two sets of poll bytes do not match, not exactly fifteen zero bytes were received, the parity bit(s) are not set correctly, or mutually exclusive actions are requested. If an error is detected in the poll bytes, the register does not respond and the process is complete. If the poll bytes are valid, the register freezes all display and LP data (310) so that the data transmitted will be consistent.

Particularly, the register must continue to accumulate data in a temporary area while the communication session is active. The block # variable is initialized to 1 (312). A determination is made whether revenue data is requested (314). Revenue data is requested if bit B0 is set to 1 in the first poll byte. The process continues with the sequence of steps set forth in FIG. 5B.

Referring now to FIG. 5B, the register prepares the register information block for transmission (316). A format of the register information block is described in the Extended Meter Reading Protocol document. The block number is '001'. The register then transmits, to the reader, the register information block (318).

Once the ETB is transmitted, the register prepares to receive a response from the reader. A timer is set to 2 seconds (320) and the register enters a loop (321, 322, 324) to wait for the response from the reader. If a response is received before the timer expires (322), and if a character is available (324), a determination is made whether the character is an ASCII ACK (06h) (326). If the character received is an ACK (326), the reader received the block of data correctly and the register can proceed. If anything other than an ACK is received, it is assumed to be an ASCII NAK (15h), and the data is transmitted again (318–326). Once the data is transmitted correctly, the block # is incremented by 1 (328). The process continues as illustrated in FIG. 5C.

Referring now to FIG. 5C, the register formats the data for the display data block (330). Particularly, registers are typically programmed with at least two display programs. The "normal" display 117, which is what the register scrolls through on its display under normal operation. Most registers also contain an "alternate" display program which can be initiated by various means. A register may contain other display programs.

Using the Standard Meter Reading Protocol, the reader may read the "normal" display. Using the Extend Meter Reading Protocol, the reader may select the display program (table) to be read. If the standard poll is used, the "normal" display table is returned. If the "extended" poll is used, an additional byte is used to specify the display table to read. The format of the display data block is described in the Extended Meter Reading Protocol document. For each item in the display table, any calculations necessary to produce the item are performed and the results are converted into ASCII characters and stored left-most byte first. If no LP data is to follow, the block is terminated with an EOT character. Otherwise it is terminated with an ETX character.

The register then transmits the display data block (332).

Once the entire display data block is transmitted, a timer is set to 2 seconds (334) and the register enters a loop (335, 336, 338) to wait for an acknowledgment from the reader. If the timer expires (336), the process is done. If a character arrives (338), a determination is made if the character received is an ASCII ACK (06h) (340). If an ACK was received, the reader received the data correctly and the register can move on to the next step. If any character other than an ACK is received, it is assumed to be a NAK (15h), and the display data block is re-transmitted (332–340) until an ACK is received.

Once the display data block is transmitted correctly, the block # is incremented by 1 (342). If LP data were requested (344) and is supported by the register, the process continues with the steps illustrated in FIG. 5D. If LP data is not requested or if such data is requested but is not supported by the register, the process continues with the steps illustrated in FIG. 5F. LP data is requested if bit B1 of the first poll byte is set to 1.

Figure 5D:
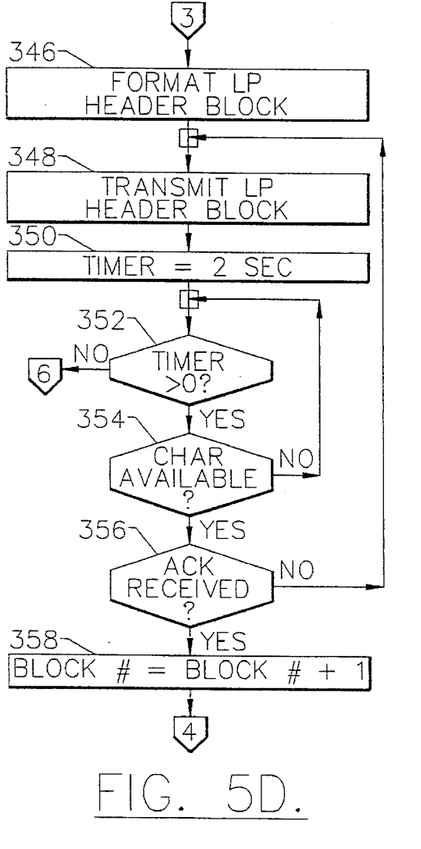

Referring now to FIG. 5D, the register formats the LP header block (346). The format of the LP header block is described in the Extended Meter Reading Protocol document. The register must determine which intervals to transmit, the number of bytes of data to transmit, and the order of the data. The reader can request all of the LP data, the LP data read since the last read, or a specific number of intervals. To request LP data, bit B1 of the first poll byte is set to 1. The amount and order of the LP data is determined by additional bits. In an EMRP context, to request all LP data, the reader sets bit B2 of the first poll byte to 0 and bit B2 of the extended poll byte to 0 (if an extended poll is used). To request the LP data since the last read, the reader sets bit B2 of the first poll byte to 1 and bit B2 of the extended poll byte to 0 (if an extended poll is used). This feature should be used in conjunction with the function to update the LP pointer. The pointer should be updated each time the LP data is read. To request a specific number of intervals, an extended poll is necessary. Bit B2 of the first poll byte is set to 0 (all data) and bit B2 of the extended poll to 1. Four additional bytes are included to specify the number of intervals, if any, to skip and the number of intervals to read.

The number of intervals to skip, i.e., interval offset, is relative to the first interval to transmit. The number of intervals skipped is dependent on the order of the LP data. Independent of the amount of LP data read, the reader can specify the order of the LP data. If bit B1 of the extended poll is set to 1, the interval data i s sent most recent interval first. Otherwise it is sent oldest interval first. Once the register has determined the number of intervals to return, it calculates the number of bytes of LP data to be returned and fills in the LP header block. The LP header block is then transmitted (348).

Once the LP header block has been transmitted, the register sets a timer for 2 seconds (350) and enters a loop (351, 352, 354 ) to wait for a response. If the timer expires (352) before a response is received, the process is done. If a character is received (354) a determination is made whether it is an ACK (356). If the character is not an ACK, it is assumed to be an NAK, and the register re-transmits the data (348–356) until a positive acknowledgment is received. Once an ACK is received, the block # is incremented by 1 (358) and the process continues with the steps illustrated in FIG. 5E.

Figure 5E:
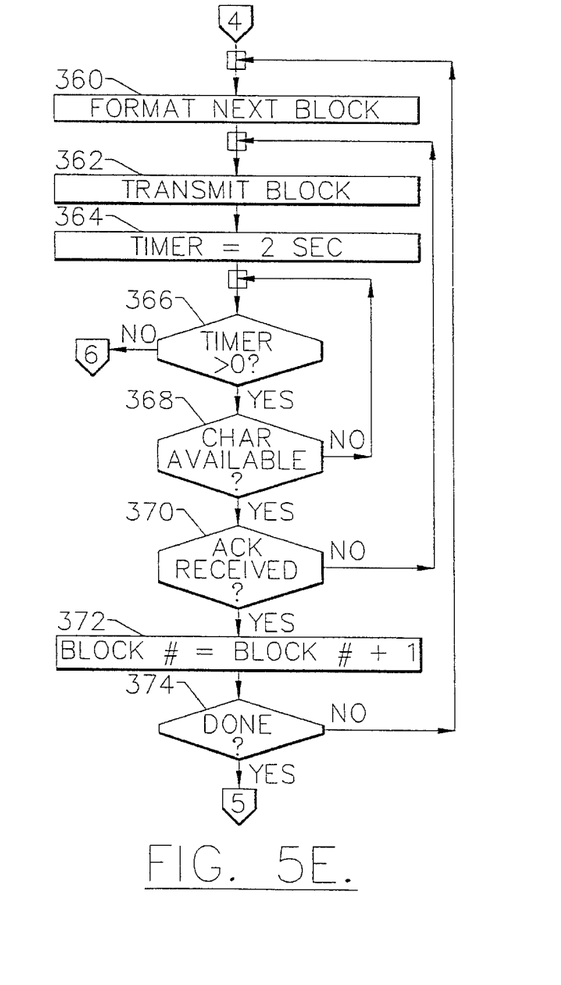

Referring now to FIG. 5E, the register prepares the first block of LP data for transmission (360). In an EMRP context, the format of an LP data block is described in the Extended Meter Reading Protocol document. The register then transmits the LP data block (362), sets a timer for 2 seconds (364) and enter a loop (365, 366, 368) to wait for a response. If the timer expires (366) the process is done. If a character arrives (368), a determination is made whether it is an ACK (370). If the character is not an ACK, it is assumed to be a NAK and the current LP data is retransmitted (362–370). Once an ACK is received, the block # is incremented by 1 (372) and a determination is made if the last LP data block was transmitted (374). The register loops through steps 360–374 until the last LP data block is transmitted. If there is not enough LP data to fill the last block, the remainder of the 256 bytes is zero filled (360). The last LP data block is terminated with an EOT character. The process continues with the sequence of process steps illustrated in FIG. 5F.

Figure 5F:
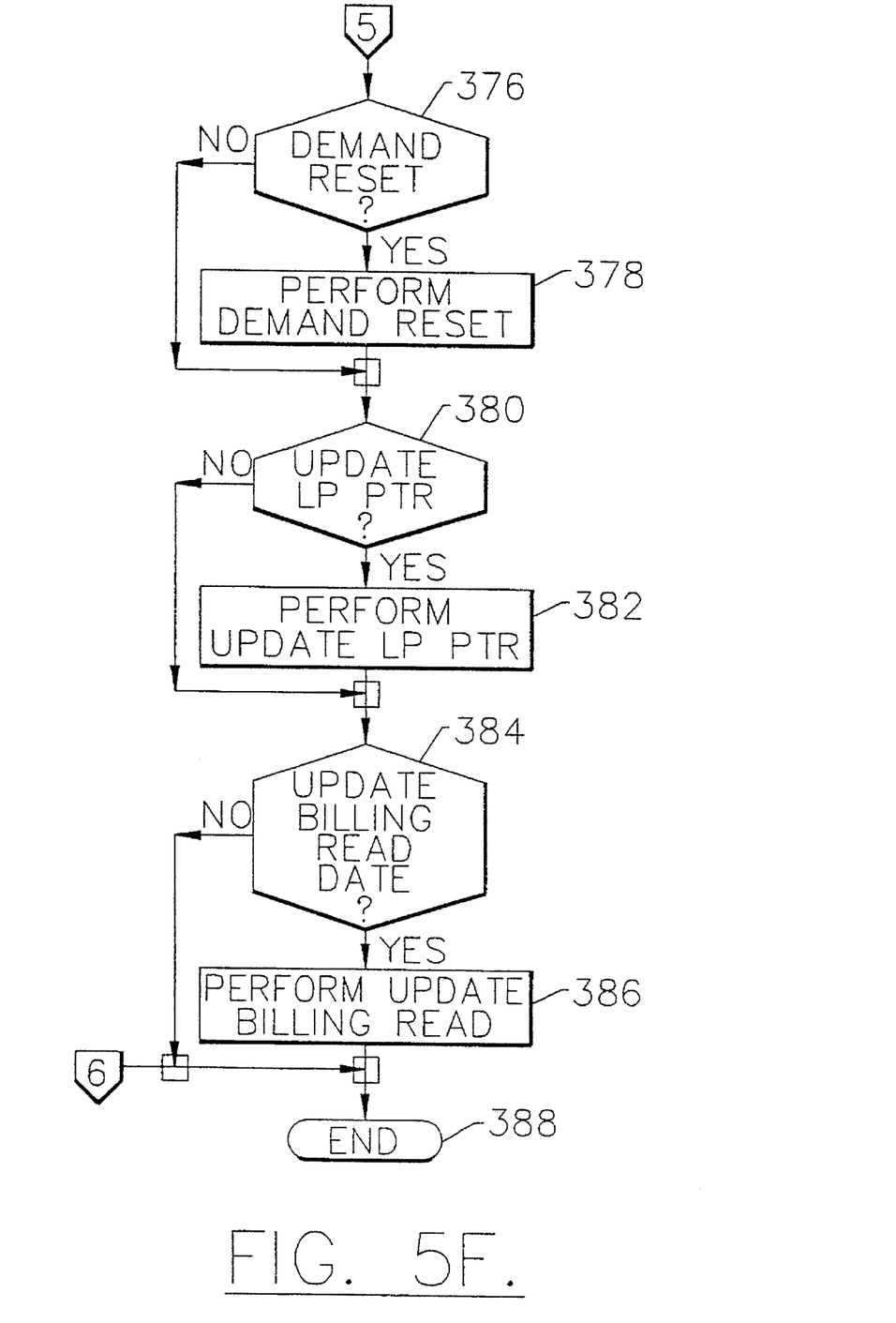

Referring now to FIG. 5F, once all of the data requested has been transmitted successfully, any functions requested by the reader are performed by the register. In an EMRP context, if bit B3 of the first poll byte is set to 1, demand reset (376), the function to perform a demand reset is called (378). All of the demand values are then reset to zero. If bit B4 of the first poll byte is set to 1, the LP pointer (380) is to be updated. A function to update the LP pointer is then called (382). The LP pointer is set to point at the most recently recorded interval. If bit B5 of the first poll byte is set to 1, billing "read date" (384) is to be updated and a function to update the billing read date is called (386). The billing read date and time is set to the date and time of the current read. The process is then complete (388).

Once the register has finished processing the poll, the register is updated with data collected during the communication session and returns to start (302) and waits for another poll.

The foregoing describes, in detail, an algorithm for selecting a display table to be read from the register, updating the billing read date and time in the register, reversing the order in which load profile (LP) data is transmitted from the register to the reader, specifying the number of LP intervals to be read from the register, and specifying the number of intervals to skip when reading from the register. The present invention provides many advantages. For example, using the present algorithm, it is possible to select a display format for load profile data.

Although the present invention has been described in an EMRP context, the present invention has utility in other contexts. In addition, the communications media utilized to couple the meter register to an external reading device (e.g., handheld reader, computer) may be any media such as radio, optical, fiber optic, etc.

While the present invention has been described with respect to specific embodiments, many modifications, variations, substitutions, and equivalents will be apparent to those skilled in the art. Accordingly, the invention is to be considered as limited only by the spirit and scope of the appended claims.

What is claimed is:

1. An electrical metering device comprising:

metering means for measuring power consumption of an electrical load associated with the electrical metering device;

register means, operatively connected to said metering means, for tabulating load profile data related to the measured power consumption of the associated electrical load and for storing the tabulated load profile data in a plurality of load profile data blocks; and means for bidirectionally communicating between said register means and an external communications device wherein said communicating means comprises:

means for receiving control signals, from the external communications device, indicative of a predetermined format of the load profile data to be transmitted, the respective load profile data blocks to be transmitted, the respective load profile data blocks to be skipped and a predetermined order of transmission of the designated load profile data blocks; and means for transmitting the load profile data blocks designated to be transmitted, to the external communications device, in response to the predetermined format and predetermined order of transmission of the load profile data blocks indicated by the control signals, and for skipping the load profile data blocks designated to be skipped such that only a portion of the tabulated and stored load profile data is transmitted.

2. An electrical metering device according to claim 1 wherein said register means includes means for periodically tabulating load profile data and means for storing the periodically tabulated load profile data chronologically in the plurality of load profile data blocks.

3. An electrical metering device according to Claim 2 wherein said load profile data block transmitting means includes means for transmitting the most recently tabulated and stored load profile data blocks.

4. An electrical metering device according to claim 1 wherein said register means includes means for displaying the tabulated load profile data according to one of a plurality of predetermined display formats, and wherein the control signals received by said receiving means include a signal indicative of the predetermined display format according to which said displaying means is to display the tabulated load profile data.

5. An electrical metering device according to claim 1 wherein the external communications device is a power line associated with the electrical metering device, and wherein said communicating means further comprises:

a modem for receiving control signals from the power line and transmitting load profile data via the power line;

a microprocessor, operatively connected to said modem and responsive to the received control signals, for controlling the transmission of the load profile data indicated by the control signals; and memory means, operatively connected to the said microprocessor, for storing instructions for controlling the operation of said microprocessor.

6. An electrical metering device according to claim 1 wherein the external communications device is an external optical communications device, and wherein said communicating means further comprises:

an optical port for receiving control signals from the external optical communications device and transmitting load profile data to the external optical communications device;

a microprocessor, operatively connected to said optical port and responsive to the received control signals, for controlling the transmission of the load profile data indicated by the control signals; and memory means, operatively connected to the said microprocessor, for storing instructions for controlling the operation of said microprocessor.

7. An electrical metering apparatus according to claim 1 wherein said register means further comprises means, responsive to said receiving means, for maintaining the integrity of the designated load profile data blocks once control signals requesting transmission of the designated load profile data blocks are received, said integrity maintaining means comprising temporary storage means for storing load profile data tabulated during the transmission of the designated load profile data blocks by said transmitting means.

8. An electrical metering apparatus according to claim 1 wherein said register means further comprises:

means for maintaining a load profile data transmission date designating the date and time at which load profile data blocks were transmitted to the external communications device; and means, responsive to said transmitting means, for updating the load profile data transmission date in response to the transmission of load profile data blocks such that the load profile data transmission date designates the date and time of the most recent transmission of load profile data blocks.

9. An electrical metering apparatus according to claim 1 wherein said register means includes load profile data block pointing means for designating the load profile data block which was most recently transmitted, and wherein said transmitting means includes means for updating the load profile data block pointing means following each transmission of a load profile data block such that said load profile data block pointing means continues to designate the most recently transmitted load profile data block.

10. A method of transmitting data from an electrical metering device indicative of the power consumption of an electrical load associated with the electrical metering device, the method comprising the steps of:

measuring the power consumption of an electrical load associated with the electrical metering device;

tabulating load profile data related to the measured power consumption of the associated electrical load;

storing the tabulated load profile data in a plurality of load profile data blocks;

receiving control signals indicative of a predetermined format of the load profile data to be transmitted, the respective load profile data blocks to be transmitted, the respective load profile data blocks to be skipped and a predetermined order of transmission of the designated load profile data blocks;

transmitting the load profile data blocks designated to be transmitted in the predetermined format and in the predetermined order of transmission indicated by the received control signals; and skipping the load profile data blocks designated to be skipped by the received control signals such that only a portion of the tabulated and stored load profile data is transmitted.

11. The method according to claim 10 wherein said step of tabulating load profile data includes the step of periodically tabulating load profile data and storing the periodically tabulated load profile data chronologically in the plurality of load profile data blocks.

12. The method according to claim 11 wherein said step of transmitting load profile data blocks further comprises the step of initially transmitting the most recently tabulated and stored load profile data blocks.

13. The method to claim 10 wherein said step of receiving control signals includes the steps of optically receiving control signals, and wherein the step of transmitting load profile data includes the step of optically transmitting load profile data.

14. The method according to claim 10 wherein said step of measuring the power consumption includes the step of measuring the power consumption of an electrical load from a power line associated with the electrical metering device, and wherein said steps of receiving control signals includes the step of receiving control signals, via the power lines, and wherein said step of transmitting load profile data includes the step of transmitting load profile data via the power lines.

15. The method according to claim 10 further comprising the steps of detecting an impending power outage and storing the load profile data in the plurality of load profile data blocks.

16. The method according to claim 10 further comprising the step of displaying the tabulated load profile data according to one of a plurality of predetermined display formats, and wherein said step of receiving control signals comprises the step of receiving a control signal indicative of the predetermined display format according to which the tabulated load profile data is to be displayed.

17. The method according to claim 10 further comprising the step of maintaining the integrity of the designated load profile data blocks during said transmitting and skipping steps by storing load profile data tabulated during said transmitting and skipping steps in a temporary storage means.

18. A method according to claim 10 further comprising the steps of:

maintaining a load profile data transmission date designating the date and time at which load profile data blocks were transmitted to the external communications device; and updating the load profile data transmission date in response to the transmission of load profile data blocks such that the load profile data transmission date designates the date and time of the most recent transmission of load profile data blocks.

* * * * *